US012264639B2

(12) United States Patent
Ancimer et al.

(10) Patent No.: US 12,264,639 B2
(45) Date of Patent: Apr. 1, 2025

(54) FUEL EJECTOR ASSEMBLY FOR FUEL ASSISTED EGR FLOW

(71) Applicant: CUMMINS INC., Columbus, IN (US)

(72) Inventors: Richard J. Ancimer, Toronto (CA); Hui Xu, Carmel, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/098,768

(22) Filed: Jan. 19, 2023

(65) Prior Publication Data

US 2023/0228234 A1 Jul. 20, 2023

Related U.S. Application Data

(60) Provisional application No. 63/301,242, filed on Jan. 20, 2022.

(51) Int. Cl.
*F02M 21/02* (2006.01)
*F02M 26/00* (2016.01)

(52) U.S. Cl.
CPC .... *F02M 21/0248* (2013.01); *F02M 21/0239* (2013.01); *F02M 26/00* (2016.02); *F02M 2026/001* (2016.02)

(58) Field of Classification Search
CPC .. F02M 2026/001; F02M 26/00; F02M 26/17; F02M 26/09; F02M 26/24; F02M 26/25; F02M 26/28; F02M 26/32; F02M 26/33; F02M 21/0239; F02M 21/0248; F02M 26/36
See application file for complete search history.

(56) References Cited

U.S. PATENT DOCUMENTS 5,845,480 A * 12/1998 DeFreitas ............... F02P 23/04 60/776
9,303,557 B2 4/2016 Ulrey et al.
10,669,954 B2 6/2020 King et al.
10,858,983 B2 12/2020 Uhrich et al.
11,215,132 B1 * 1/2022 Han ....................... F02M 26/17
2014/0352668 A1 * 12/2014 Styles .................. F02M 31/042 123/552
2015/0267650 A1 * 9/2015 Siuchta ............. F02M 21/0215 60/274
2016/0108862 A1 4/2016 Siuchta et al.
2020/0018267 A1 * 1/2020 Baek ....................... F02B 43/10

FOREIGN PATENT DOCUMENTS

WO WO-2021/004647 1/2021

* cited by examiner

*Primary Examiner* — Phutthiwat Wongwian
*Assistant Examiner* — Diem T Tran
(74) *Attorney, Agent, or Firm* — Foley & Lardner LLP

(57) ABSTRACT

A fuel ejector assembly includes a nozzle structured to receive fuel from a fuel conduit and eject the fuel therethrough, and an exhaust gas recirculation ("EGR") conduit structured to communicate a recirculated exhaust gas therethrough. A mixing portion is disposed downstream of the nozzle and the EGR conduit, the nozzle and the EGR conduit fluidly coupled to the mixing portion such that the mixing portion receives each of the fuel and the recirculated exhaust gas. A diffuser is disposed downstream of the mixing portion and is configured to be fluidly coupled to an engine to communicate a mixture of the fuel and the recirculated exhaust gas to the engine.

19 Claims, 3 Drawing Sheets

FUEL EJECTOR ASSEMBLY FOR FUEL ASSISTED EGR FLOW

CROSS-REFERENCE TO RELATED APPLICATIONS

This application claims priority to and the benefit of U.S. Provisional Patent Application No. 63/301,242, filed Jan. 20, 2022, the content of which is herein incorporated by reference.

TECHNICAL FIELD

The present disclosure relates generally to internal combustion engine systems including an exhaust gas recirculation ("EGR") system.

BACKGROUND

Increasing efficiency of internal combustion engines is important for meeting customer expectations and various government-mandated regulations. Some internal combustion engines may use natural gas as its fuel source. Natural gas engines are spark ignited engines that can be operated at stoichiometric conditions.

SUMMARY

Embodiments described herein relate generally to systems and methods for inserting recirculated exhaust gas with fuel into the engine, and in particular to a fuel ejector assembly that includes a nozzle that receives pressurized fuel flow and accelerates the fuel flow into a mixing portion that also receives recirculated exhaust gas from an EGR conduit. The excess energy ("exergy") of the pressurized fuel propels the recirculated exhaust gas into an engine, reducing backpressure that the engine has to exert to draw the recirculated exhaust gas therein.

In a set of embodiments, a fuel ejector assembly comprises a nozzle structured to receive fuel from a fuel conduit and eject the fuel therethrough, and an exhaust gas recirculation ("EGR") conduit structured to communicate a recirculated exhaust gas therethrough. A mixing portion is disposed downstream of the nozzle and the EGR conduit, the nozzle and the EGR conduit fluidly coupled to the mixing portion such that the mixing portion receives each of the fuel and the recirculated exhaust gas. A diffuser is disposed downstream of the mixing portion and is structured to be fluidly coupled to an engine to communicate a mixture of the fuel and the recirculated exhaust gas to the engine.

In another set of embodiments, a fuel insertion system includes a fuel conduit that receives fuel from a fuel source and a fuel ejector assembly. The fuel ejector assembly includes a nozzle structured to receive the fuel from the fuel conduit and eject the fuel therethrough, an exhaust gas recirculation ("EGR") conduit structured to communicate recirculated exhaust gas therethrough, a mixing portion disposed downstream of the nozzle and the EGR conduit, the nozzle and the EGR conduit fluidly coupled to the mixing portion such that the mixing portion receives each of the fuel and the recirculated exhaust gas, and a diffuser disposed downstream of the mixing portion and structured to be fluidly coupled to an engine to communicate a mixture of the fuel and the recirculated exhaust gas to the engine. The fuel insertion system further includes a fuel flowrate control valve coupled to the fuel conduit and selectively adjusts a flowrate of the fuel flowing from the fuel source towards the fuel ejector assembly via the fuel conduit, and a controller that operates the fuel flowrate control valve to adjust the flowrate of the fuel flowing from the fuel source towards the fuel ejector assembly.

In another set of embodiments, a method for controlling fuel assisted flow of a recirculated exhaust gas to an engine via a fuel ejector assembly is disclosed. The method includes determining, by a controller based on a pressure signal received from a pressure sensor, at least one of an engine pressure or a mixture pressure, the mixture pressure comprising a pressure of a mixture, the mixture comprising a fuel and the recirculated exhaust gas. The method further includes determining, by the controller based on a flowrate signal received from a flowrate sensor, an exhaust gas recirculation ("EGR") flowrate, the EGR flowrate comprising a flowrate of the recirculated exhaust gas. The method further includes adjusting, by the controller based on at least one of an operating condition of the engine, the engine pressure, or the mixture pressure, a fuel flowrate control valve to control a flowrate of the fuel to the engine. The method further includes adjusting, by the controller based on at least one of the operating condition of the engine, the engine pressure, or the mixture pressure, a bypass valve to control the EGR flowrate to the engine. The method further includes adjusting, by the controller based on the EGR flowrate and at least one of the engine pressure or the mixture pressure, an EGR valve to control the EGR flowrate to the engine.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
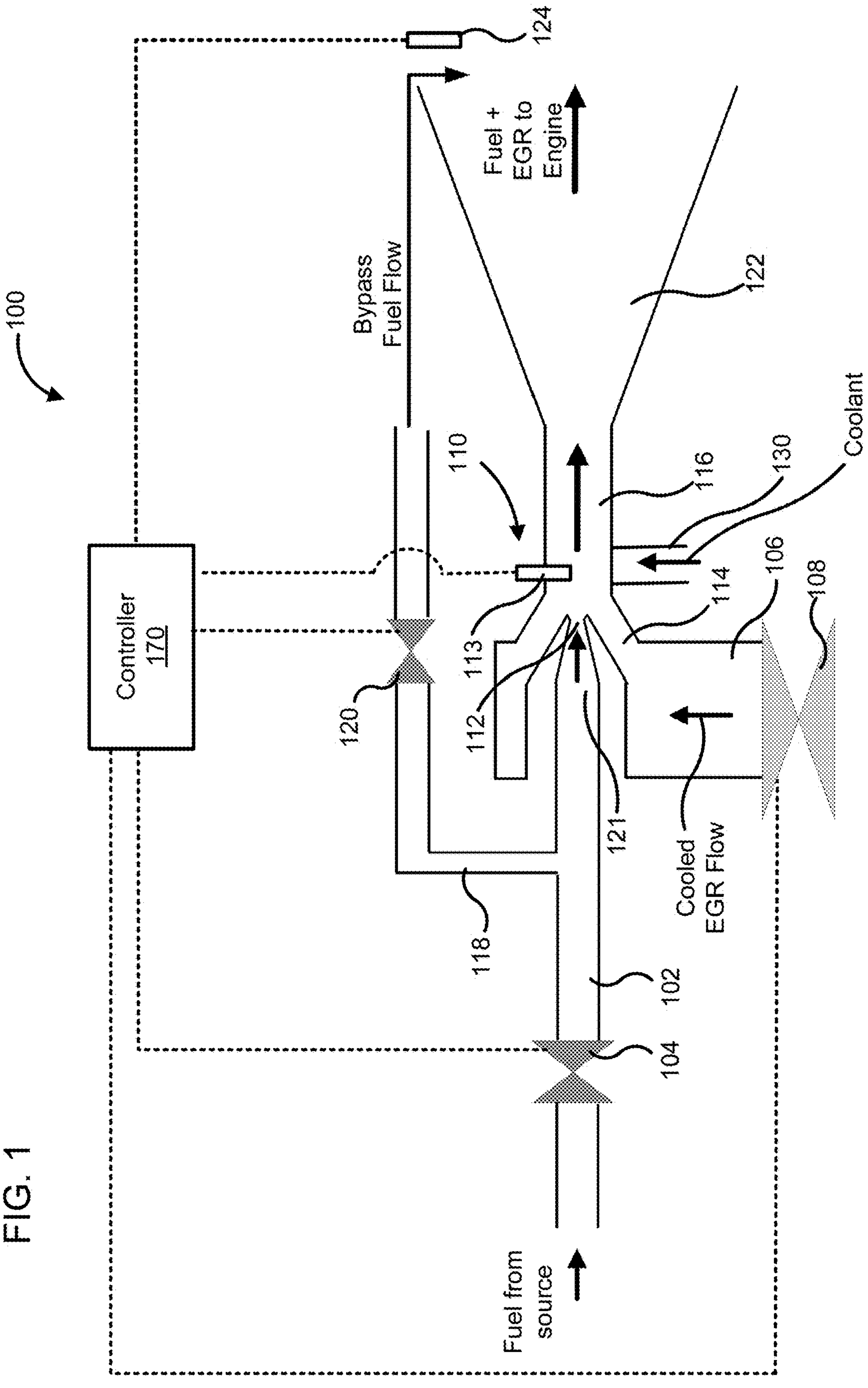
FIG. 1 is a schematic illustration of a fuel ejector assembly for an engine, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for inserting recirculated exhaust gas with fuel into the engine, and in particular to a fuel ejector assembly that includes a nozzle that receives pressurized fuel flow and accelerates the fuel flow into a mixing portion that also receives recirculated exhaust gas from an EGR conduit. The exergy of the pressurized fuel propels the recirculated exhaust gas into an engine, reducing backpressure that the engine has to exert to draw the recirculated exhaust gas therein, thereby increasing engine efficiency and decreasing fuel consumption (e.g., increases fuel economy).

Natural gas fuel sources may be configured to store natural gas in the form of compressed natural gas ("CNG") that is pressurized and, therefore, has exergy. The fuel insertion assemblies described in the present application utilize this exergy of the CNG to entrain EGR flow (e.g., the recirculated exhaust gas) and propel the recirculated exhaust gas along with the CNG towards the engine so as to reduce the negative pressure that has to be exerted by the engine to draw the recirculated exhaust gas, and allowing the engine to operate at more positive engine differential pressure.

Embodiments of the fuel ejector assemblies and methods of controlling and operating such fuel ejector assemblies may provide one or more benefits including, for example: (1) reducing negative pressure required by engine to draw recirculated exhaust gas therein, thereby reducing fuel consumption and increasing fuel economy; (2) providing a bypass conduit so as to allow independent control of EGR flow, thereby avoiding losses due to EGR flow control; (3) inhibiting water condensation within the fuel ejector assembly using engine out coolant; (4) allowing control of EGR flow to engine using multiple control point, thereby reducing pressure required by the engine to draw the recirculated exhaust gas under various operating conditions; (5) allowing EGR flow control without requiring a restriction in the EGR flow path; and (6) providing improvement in engine efficiency of up to 5% across most of the engine operating conditions, and at least 1% even under high efficiency operating conditions in which conventional air handling systems and EGR systems are designed to operate with lowest pumping losses.

While various embodiments of the fuel ejector assemblies described herein are described with respect to "natural gas" as the fuel, it should be appreciated that the various embodiments of the fuel ejector assemblies described herein are equally suitable for operation with any other pressurized fuel source, for example, liquefied natural gas (LNG), gasoline, alcohols, E85 fuel, mixtures of the foregoing, fuels in a gaseous state (natural gas, hydrogen, ammonia, propane, butane), any other suitable pressurized fuel or combinations thereof. Fuels stored as a liquid and transformed into a gaseous state using waste heat or another mechanism (LNG, liquefied petroleum gas (LPG), liquid ammonia, alcohols, gasoline, etc.) could also be used. All such fuels are contemplated and should be understood to be within the scope of this disclosure.

FIG. 1 is a schematic illustration of a fuel insertion system 100, according to an embodiment. The fuel insertion system 100 may include a fuel conduit 102, a fuel ejector assembly 110, and a controller 170. The fuel conduit 102 is structured to be coupled to a fuel source, for example, a CNG cylinder, a hydrogen cylinder, a pump that is coupled to a liquid fuel source (e.g., a gasoline, an alcohol, or an E85 fuel source), a LPG, liquid $NH_3$ or LNG cylinder with a heat exchanger to vaporize the pressurized fuel, etc., and structured to receive pressurized fuel therefrom. In some embodiments, the fuel conduit 102 is fluidly coupled to the fuel ejector assembly 110. In some embodiments, fuel flowrate control valve 104 is fluidly coupled to the fuel conduit 102 and configured to selectively adjust a flowrate of fuel (e.g., CNG, LNG, gasoline, alcohol, etc.) flowing from the fuel source towards the fuel ejector assembly 110 via the fuel conduit 102, for example, based on operating conditions of the engine.

In some embodiments, a pressure of the fuel within the fuel source may be regulated to a pressure at which the fuel flowrate control valve 104 operates (e.g., in a range of 10 bar to 30 bar, inclusive). While not shown, in some embodiments, a fuel filter may be coupled to the fuel conduit 102 and configured to filter the fuel flowing towards the fuel ejector assembly 110. Moreover, temperature and pressure management regulators may be coupled to the fuel source so as to allow controlling of a temperature and/or pressure of the fuel contained therein.

The fuel ejector assembly 110 includes a nozzle 112, an EGR inlet conduit 114, a mixing portion 116, and a diffuser 122 disposed downstream of the mixing portion 116. The nozzle 112 is structured to receive fuel from the fuel conduit 102 (e.g., the fuel conduit 102 is fluidly coupled to the nozzle 112), and eject the fuel therethrough. The nozzle 112 may include an orifice having any suitable diameter, so long as the total effective flow area (the sum of areas of the nozzle 112 and a bypass valve 120 (discussed in further detail below)) is sufficiently large to allow for the maximum required fuel flow to the engine at the relevant operating conditions downstream of the fuel flowrate control valve 104. The total effective flow area scales with (a) the size/rating of the engine (with a larger area for higher power ratings), (b) the available pressure in the fuel conduit 102 (which depends on the minimum pressure upstream of the fuel flowrate control valve 104 (the "empty pressure") and the pressure loss across the fuel flowrate control valve 104; and (c) the temperature of the gas in the fuel conduit 102. The nozzle 112 is coupled to the mixing portion 116 at a downstream end of the nozzle 112. The nozzle 112 is structured to eject the pressurized fuel into the mixing portion 116.

The EGR inlet conduit 114 is coupled to the mixing portion 116 downstream of the nozzle 112. The EGR inlet conduit 114 is structured to receive the recirculated exhaust gas from an EGR conduit 106 and configured to communicate the recirculated exhaust gas into the mixing portion 116. The mixing portion 116 is disposed downstream of the nozzle 112 and the EGR inlet conduit 114, and the nozzle 112 and the EGR inlet conduit 114 are fluidly coupled to the mixing portion 116 such that the mixing portion receives each of the fuel and the recirculated exhaust gas. The pressurized fuel being communicated into the mixing portion 116 entrains and mixes with the recirculated exhaust gas that is simultaneously being communicated into the mixing portion 116 via the EGR inlet conduit 114. The exergy of the fuel propels the recirculated exhaust gas towards the engine, thereby reducing the pressure required by the engine to draw the recirculated exhaust gas therein, thereby increasing engine efficiency and fuel economy.

A diffuser 122 is disposed downstream of the mixing portion 116 and is fluidly coupled thereto. The diffuser 122 may have a constantly expanding cross-sectional width (e.g., diameter) from the mixing portion 116 to downstream thereof to cause expansion of the fuel/recirculated exhaust gas mixture as it is communicated to the engine. The diffuser 122 is structured to be fluidly coupled to the engine, for example to a fuel inlet manifold of the engine, to communicate the mixture of the fuel and the recirculated exhaust gas to the engine. In some embodiments, a pressure sensor 124 may be operatively coupled to the diffuser or downstream thereof (e.g., the fuel inlet manifold of the engine) and configured to measure a pressure exerted by the engine, or a pressure of the fuel/EGR mixture.

The EGR inlet conduit 114 is fluidly coupled to the EGR conduit 106 to receive the recirculated exhaust gas therefrom. The EGR conduit 106 may be included in a high pressure EGR loop, and structured to recirculate a portion of an exhaust gas received from an exhaust manifold that receives exhaust gas produced by the engine. In some embodiments, an EGR valve 108 may be coupled to the EGR conduit 106 and configured to be selectively opened, closed, or otherwise adjusted to control (e.g., adjust, etc.) a flowrate of the recirculated exhaust gas flowing from EGR conduit 106 into the mixing portion 116 via the EGR inlet conduit 114.

In some instances, the EGR flow may be pulsed flow that can result in pressure pulsations. When the pressure pulsations of the recirculated exhaust gas result in a MAP/P_S0 ratio (a ratio of the intake manifold pressure relative to a static pressure in the EGR conduit 106) of less than 1, the flowrate of the entrained recirculated exhaust gas is based on the geometric constraints of the fuel ejector assembly 110 and not based on the exergy of the fuel. In such instances, the EGR valve 108 may be used to reduce the recirculated exhaust gas flowrate so as to reduce the pressure exerted by the engine for drawing the recirculated exhaust gas (e.g., by fully opening the EGR valve 108 at high engine speeds or during high engine torque conditions), or closing the EGR valve 108 when to inhibit excess EGR flow due to the available engine pressure.

In some embodiments, a flowrate sensor 113 may also be operatively coupled to the mixing portion 116 or the EGR conduit 106 and configured to measure a flowrate of the recirculated exhaust gas (e.g., the EGR flowrate) flowing into the mixing portion 116. In other embodiments, an EGR flow sensor may be positioned upstream of the EGR valve 108, or a fuel+recirculated exhaust gas flow sensor may be positioned downstream of the fuel ejector assembly 110 (upstream or where air is missed with the fuel/recirculated exhaust gas combination). The measured EGR flowrate may be used to control opening or closing of the EGR valve 108. It should be understood that the flowrate sensors discussed herein can be either "direct" or "indirect" flowrate sensors. By way of example, a pressure sensor or a wide range lambda sensor can be used to infer the actual flow rate, or a combination of sensors positioned at different locations (e.g., upstream and downstream of the mixing portion 116) may be used to measure a change in the flow rate.

While not shown, pressure and temperature sensors may also be operatively coupled to the fuel ejector assembly 110 (e.g., the mixing portion) and configured to measure a pressure and/or temperature of the fuel/recirculated exhaust gas mixture.

In some embodiments, the fuel insertion system 100 may also include a coolant conduit 130 structured to communicate heated coolant around the mixing portion or the EGR inlet conduit 114 to heat the recirculated exhaust gas and/or the fuel/recirculated exhaust gas mixture. The heated coolant may be an engine coolant that is recirculated around the fuel ejector assembly after cooling the engine, before being circulated back to a radiator of the engine. In some embodiments, the heated coolant is circulated back to the radiator via the coolant conduit 130. The heating provided by the heated coolant inhibits water condensation within the fuel ejector assembly 110 and/or EGR inlet conduit 114, as such water condensation may be detrimental to engine performance.

The fuel ejector assembly 110 also includes a bypass line 118 fluidly coupled to the fuel conduit 102 upstream of the nozzle 112. The bypass line 118 is structured to receive a portion of the fuel flowing through the fuel conduit 102 and communicate the portion of the fuel downstream of the diffuser 122. A bypass valve 120 is fluidly coupled to the bypass line 118 and configured to selectively adjust a flowrate of the portion of the fuel flowing through the bypass line 118. By adjusting the amount of fuel bypassing the fuel ejector assembly 110 through the bypass line 118 via the bypass valve 120, the flowrate of the recirculated exhaust gas flowing into the engine may also be controlled without having to control the flow of the recirculated exhaust gas via the EGR valve 108 (at least in some operating conditions of the engine) which reduces operational losses. In some embodiments and as shown in FIG. 1, the bypass line 118 is fluidly coupled to the fuel conduit 102 downstream of the fuel flowrate control valve 104. In other embodiments, the bypass line 118 may be coupled to the fuel conduit 102 upstream of the fuel flowrate control valve 104.

In some embodiments, the fuel ejector assembly 110 may also include a controller 170 operatively coupled to the fuel flowrate control valve 104, the EGR valve 108, the flowrate sensor 113, the bypass valve 120, and the pressure sensor 124. The controller 170 may be operably coupled to the aforementioned components and/or any other components of the fuel ejector assembly 110 using any type and number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

The controller 170 may be configured to receive a pressure signal from the pressure sensor 124 and determine an engine pressure and/or the fuel/recirculated exhaust gas mixture pressure therefrom. The controller 170 may also be configured to receive an EGR flowrate signal from the flowrate sensor 113 and determine the EGR flowrate therefrom. Based on the engine pressure and/or the fuel/recirculated exhaust gas mixture pressure and/or the EGR flowrate, the controller 170 is configured to adjust (e.g., operate, control, etc.) one or more of the fuel flowrate control valve 104, the bypass valve 120, and/or the EGR valve 108 to adjust a flowrate of the fuel/recirculated exhaust gas mixture to the engine and reduce pressure exerted by the engine for drawing the recirculated exhaust gas.

Figure 2:
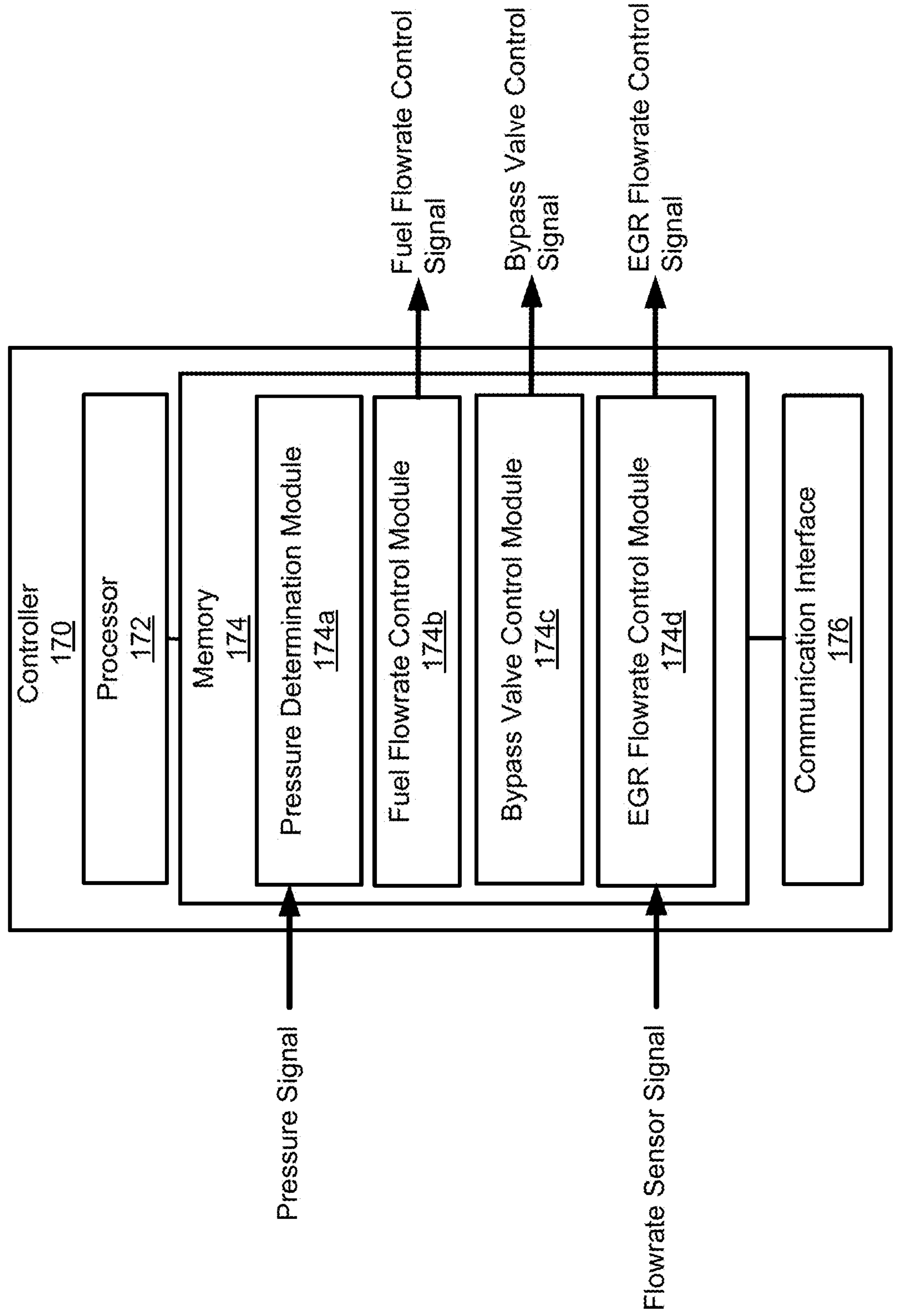
FIG. 2 is a schematic block diagram of a controller that may be used to control the operations of the fuel ejector assembly of FIG. 1, according to an embodiment.

In some embodiments, the controller 170 includes various circuitries or modules configured to perform the operations of the controller 170 described herein. For example, FIG. 2 shows a block diagram of the controller 170, according to an embodiment. The controller 170 may include a processor 172, a memory 174, or any other computer readable medium, and a communication interface 176. Furthermore, the controller 170 includes a pressure determination module 174*a*, a fuel flowrate control module 174*b*, a bypass valve control module 174*c*, and an EGR flowrate control module 174*d*. It should be understood that FIG. 2 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions, for example, for controlling regeneration.

In one configuration, the pressure determination module 174*a*, the fuel flowrate control module 174*b*, the bypass valve control module 174*c*, and the EGR flowrate control module 174*d* are embodied as machine or computer-readable media (e.g., stored in the memory 174) that is executable by a processor, such as the processor 172. As described herein and amongst other uses, the machine-readable media (e.g., the memory 174) facilitates performance of certain operations of the pressure determination module 174*a*, the fuel flowrate control module 174*b*, the bypass valve control module 174*c*, and the EGR flowrate control module 174*d* to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the pressure determination module 174*a*, the fuel flowrate control module 174*b*, the bypass valve control module 174*c*, and the EGR flowrate control module 174*d* are embodied as hardware units, such as electronic control units. As such, the pressure determination module 174*a*, the fuel flowrate control module 174*b*, the bypass valve control module 174*c*, and the EGR flowrate control module 174*d* may be embodied as one or more circuitry components including, but not limited to, processing circuitry, network interfaces, peripheral devices, input devices, output devices, sensors, etc.

In some embodiments, the pressure determination module 174*a*, the fuel flowrate control module 174*b*, the bypass valve control module 174*c*, and the EGR flowrate control module 174*d* may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the pressure determination module 174*a*, the fuel flowrate control module 174*b*, the bypass valve control module 174*c*, and the EGR flowrate control module 174*d* may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the pressure determination module 174*a*, the fuel flowrate control module 174*b*, the bypass valve control module 174*c*, and the EGR flowrate control module 174*d* may also include programmable hardware devices such as field programmable gate arrays, programmable array logic, programmable logic devices or the like. In this regard, the pressure determination module 174*a*, the fuel flowrate control module 174*b*, the bypass valve control module 174*c*, and the EGR flowrate control module 174*d* may include one or more memory devices for storing instructions that are executable by the processor(s) of the pressure determination module 174*a*, the fuel flowrate control module 174*b*, the bypass valve control module 174*c*, and the EGR flowrate control module 174*d*. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the pressure determination module 174*a*, the fuel flowrate control module 174*b*, the bypass valve control module 174*c*, and the EGR flowrate control module 174*d*. Thus, the depicted configuration represents the aforementioned arrangement in which the pressure determination module 174*a*, the fuel flowrate control module 174*b*, the bypass valve control module 174*c*, and the EGR flowrate control module 174*d* are embodied as machine or computer-readable media. However, as mentioned above, this illustration is not meant to be limiting as the present disclosure contemplates other embodiments such as the aforementioned embodiment where the pressure determination module 174*a*, the fuel flowrate control module 174*b*, the bypass valve control module 174*c*, and the EGR flowrate control module 174*d*, or at least one of the pressure determination module 174*a*, the fuel flowrate control module 174*b*, the bypass valve control module 174*c*, and the EGR flowrate control module 174*d* are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the pressure determination module 174*a*, the fuel flowrate control module 174*b*, the bypass valve control module 174*c*, and the EGR flowrate control module 174*d*) may comprise or otherwise share the same processor which, in some example embodiments, may execute instructions stored, or otherwise accessed, via different areas of memory.

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the pressure sensor 124, the flowrate sensor 113, the fuel flowrate control valve 104, the bypass valve 120, and the EGR valve 108. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The pressure determination module 174*a* is configured to receive a pressure signal from the pressure sensor 124 and determine an engine pressure and/or the fuel/recirculated exhaust gas mixture pressure therefrom.

The fuel flowrate control module 174*b* is configured to generate a fuel flowrate control signal to control opening or closing of the fuel flowrate control valve 104 based on an operating condition of the engine (e.g., idling condition, low speed condition, high speed condition, high torque condition, etc.), and/or the engine pressure and/or the fuel/recirculated exhaust gas mixture pressure to control a flowrate of the fuel to the engine.

The bypass valve control module 174*c* is configured to generate a bypass valve control signal to control opening or closing of the bypass valve 120 to control EGR flowrate into the engine based on the operating condition of the engine, and/or the engine pressure and/or the fuel/recirculated exhaust gas mixture pressure, by controlling an amount of fuel that flows from the fuel conduit 102 through the nozzle 112 relative to an amount of fuel that bypasses the nozzle 112 via the bypass line 118.

The EGR flowrate control module 174*d* is configured to receive a flowrate signal from the flowrate sensor 113 and configured to determine a flowrate of the recirculated exhaust gas towards the engine from the mixing portion 116. Moreover, the EGR flowrate control module 174*d* is configured generate an EGR flowrate signal to control opening or closing of the EGR valve 108 based the engine pressure and/or the fuel/recirculated exhaust gas mixture pressure, and the determined flowrate of the recirculated exhaust gas to control a flowrate of the recirculated exhaust gas to the engine.

Figure 3:
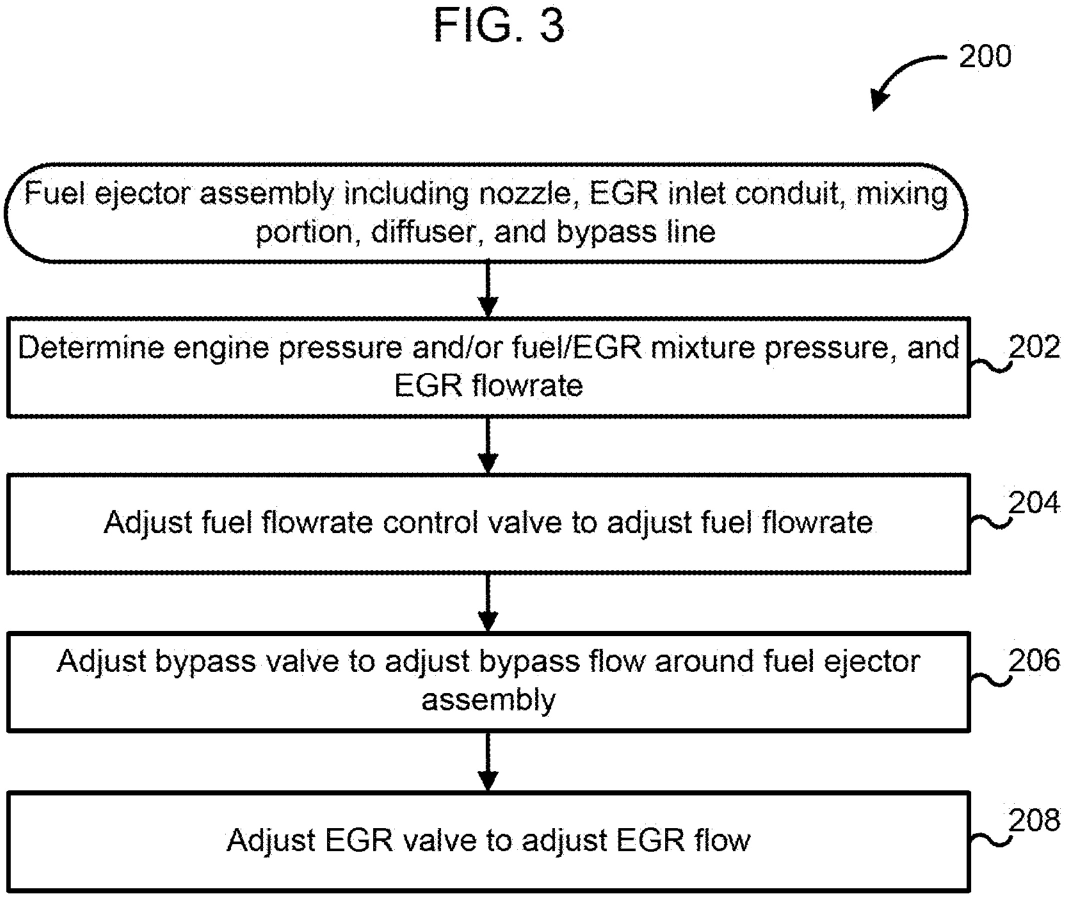
FIG. 3 is a schematic flow chart of a method for controlling operations of a fuel ejector assembly that provides fuel assisted EGR flow to an engine, according to an embodiment.

FIG. 3 is a schematic flow chart of an example method 200 for controlling fuel assisted flow of recirculated exhaust gas to an engine via a fuel ejector assembly (e.g., the fuel ejector assembly 110), that includes a nozzle (e.g., the nozzle 112), an EGR inlet conduit (e.g., the EGR inlet conduit 114), a mixing portion (e.g., the mixing portion 116), and diffuser (e.g., the diffuser 122), and in some embodiments, a bypass line (e.g., the bypass line 118). While described with reference to the fuel ejector assembly 110 and the controller, the operations of the method 200 can be used with any controller 170 that is operatively coupled to any fuel ejector assembly that includes a nozzle, an EGR inlet conduit, a mixing portion, and a diffuser, and optionally, a bypass line.

The method 200 includes determining, by the controller 170, an engine pressure and/or fuel/recirculated exhaust gas mixture pressure (e.g., based on a pressure signal received from the pressure sensor 124) and an EGR flowrate based on the flowrate signal received from the flowrate sensor 113, at 202. The controller 170 adjusts the fuel flowrate control valve 104 based on an operating condition of the engine (e.g., idling condition, low speed condition, high speed condition, high torque condition, etc.), and/or the engine pressure, and/or the fuel/recirculated exhaust gas mixture pressure, and/or the EGR flowrate to control a flowrate of the fuel to the engine and/or a flowrate of the mixture of the fuel and the recirculated gas to the engine, at 204. In some embodiments, the controller 170 adjusts the fuel flowrate control valve 104 based on an operating condition of the engine, and/or the engine pressure, and/or the fuel/recirculated exhaust gas mixture pressure to control the engine pressure. For example, the controller 170 may adjust the fuel flowrate control valve 104 to reduce the engine pressure. The controller 170 adjusts the bypass valve 120 to control EGR flowrate into the engine based on the operating condition of the engine and/or the engine pressure, and/or the fuel/recirculated exhaust gas mixture pressure, by controlling an amount of fuel that flows from the fuel conduit 102 through the nozzle 112 relative to an amount of fuel that bypasses the nozzle 112 via the bypass line 118, at 206.

The controller 170 may also adjust the EGR valve 108 based on the engine pressure and/or the fuel/recirculated exhaust gas mixture pressure, and the determined flowrate of the recirculated exhaust gas (e.g., the EGR flowrate) to control a flowrate of the recirculated exhaust gas to the engine and/or to the mixing portion 116, at 208. In some embodiments, the controller 170 controls pressure management regulators coupled to the fuel source such that a pressure of the fuel within the fuel source matches an operating pressure of the fuel flowrate control valve 104. In some embodiments, the controller 170 controls a cooling system of the engine to direct a coolant heated by the engine to at least one of the mixing portion 116 or the EGR inlet conduit 114 via a cooling conduit fluidly coupled to the cooling system. The (heated) coolant heats at least one of the recirculated exhaust gas or the mixture of the fuel and the recirculated exhaust gas, inhibiting water condensation within the at least one the fuel ejector assembly 110 or the EGR inlet conduit 114. While operations 202, 204, 206, and 208 of the method 200 are depicted as occurring in a particular sequence in FIG. 3, this is only for illustrative purposes and the operations of the method 200 can be performed in any suitable sequence and/or simultaneously with each other by the controller 170.

It should be noted that the term “example” as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A fuel ejector assembly, comprising:

a nozzle structured to receive fuel from a fuel conduit and eject the fuel therethrough;

an exhaust gas recirculation ("EGR") conduit structured to communicate a recirculated exhaust gas therethrough;

a mixing portion disposed downstream of the nozzle and the EGR conduit, the nozzle and the EGR conduit fluidly coupled to the mixing portion such that the mixing portion receives each of the fuel and the recirculated exhaust gas;

a diffuser disposed downstream of the mixing portion and structured to be fluidly coupled to an engine to communicate a mixture of the fuel and the recirculated exhaust gas to the engine; and a bypass line fluidly coupled to the fuel conduit upstream of the nozzle, the bypass line structured to receive a portion of the fuel and communicate the portion of the fuel downstream of the diffuser and upstream of the engine.

2. The fuel ejector assembly of claim 1, further comprising:

a bypass valve fluidly coupled to the bypass line and configured to selectively adjust a flowrate of the portion of the fuel flowing through the bypass line.

3. The fuel ejector assembly of claim 2, further comprising:

a fuel flowrate control valve fluidly coupled to the fuel conduit and configured to selectively adjust a flowrate of the fuel flowing towards the nozzle.

4. The fuel ejector assembly of claim 1, wherein the bypass line is fluidly coupled to the fuel conduit downstream of a fuel flowrate control valve fluidly coupled to the fuel conduit and configured to selectively adjust a flowrate of the fuel flowing towards the nozzle.

5. The fuel ejector assembly of claim 1, wherein the bypass line is fluidly coupled to the fuel conduit upstream of a fuel flowrate control valve fluidly coupled to the fuel conduit and configured to selectively adjust a flowrate of the fuel flowing towards the nozzle.

6. The fuel ejector assembly of claim 1, wherein:

the EGR conduit is further structured to recirculate a portion of an exhaust gas received from an exhaust manifold, the exhaust manifold structured to receive the exhaust gas produced by the engine; and the portion of the exhaust gas comprises the recirculated exhaust gas.

7. A fuel insertion system, comprising:

a fuel conduit configured to receive fuel from a fuel source;

a fuel ejector assembly fluidly coupled to the fuel conduit, the fuel ejector assembly comprising:

a nozzle structured to receive the fuel from the fuel conduit and eject the fuel therethrough, an exhaust gas recirculation ("EGR") conduit structured to communicate a recirculated exhaust gas therethrough, a mixing portion disposed downstream of the nozzle and the EGR conduit, the nozzle and the EGR conduit fluidly coupled to the mixing portion such that the mixing portion receives each of the fuel and the recirculated exhaust gas, a diffuser disposed downstream of the mixing portion and structured to be fluidly coupled to an engine to communicate a mixture of the fuel and the recirculated exhaust gas to the engine, and a bypass line fluidly coupled to the fuel conduit upstream of the nozzle, the bypass line structured to receive a portion of the fuel and communicate the portion of the fuel downstream of the diffuser and upstream of the engine;

a fuel flowrate control valve coupled to the fuel conduit and configured to selectively adjust a flowrate of the fuel flowing from the fuel source towards the fuel ejector assembly via the fuel conduit; and a controller configured to operate the fuel flowrate control valve to adjust the flowrate of the fuel flowing from the fuel source towards the fuel ejector assembly.

8. The fuel insertion system of claim 7, further comprising:

a flowrate sensor operatively coupled to the mixing portion or the EGR conduit and configured to measure a flowrate of the recirculated exhaust gas flowing into the mixing portion, wherein the controller is further configured to:

receive an EGR flowrate signal from the flowrate sensor and determine the flowrate of the recirculated exhaust gas therefrom, and based on the flowrate of the recirculated exhaust gas, operate the fuel flowrate control valve to adjust a flowrate of the mixture of the fuel and the recirculated exhaust gas.

9. The fuel insertion system of claim 7, further comprising:

a pressure sensor operatively coupled to the diffuser or downstream of the diffuser and configured to measure at least one of a first pressure exerted by the engine to draw the recirculated exhaust gas or a second pressure of the mixture of the fuel and the recirculated exhaust gas, wherein the controller is further configured to:

receive a pressure signal from the pressure sensor and determine the at least one of the first pressure or the second pressure therefrom, and based on the at least one of the first pressure or the second pressure, operate the fuel flowrate control valve to adjust a flowrate of the mixture of the fuel and the recirculated exhaust gas.

10. The fuel insertion system of claim 9, wherein the controller operates the fuel flowrate control valve to reduce the first pressure by operating the fuel flowrate control valve to adjust the flowrate of the mixture of the fuel and the recirculated exhaust gas.

11. The fuel insertion system of claim 7, further comprising one or more pressure management regulators coupled to the fuel source, and wherein the controller operates the one or more pressure management regulators such that a pressure of the fuel within the fuel source matches an operating pressure of the fuel flowrate control valve.

12. The fuel insertion system of claim 7, wherein:

the fuel ejector assembly comprises:

a bypass valve fluidly coupled to the bypass line and configured to selectively adjust a flowrate of the portion of the fuel flowing through the bypass line; and the nozzle comprises an orifice, the orifice comprising a diameter such that a sum of areas of the nozzle and the bypass valve corresponds to a maximum required fuel flow to the engine.

13. The fuel insertion system of claim 7, further comprising a coolant conduit structured to (i) communicate a heated coolant around at least one of the mixing portion or an EGR inlet conduit of the EGR conduit, and (ii) heat at least one of the recirculated exhaust gas or the mixture of the fuel and the recirculated exhaust gas.

14. The fuel insertion system of claim 13, wherein the coolant conduit is structured to communicate an engine coolant heated via the engine as the heated coolant.

15. The fuel insertion system of claim 13, wherein the coolant conduit is further structured to communicate the heated coolant from around the at least one of the mixing portion or the EGR inlet conduit of the EGR conduit to a radiator of the engine.

16. The fuel insertion system of claim 7, further comprising:

an EGR valve coupled to the EGR conduit and configured to selectively adjust a flowrate of the recirculated exhaust gas flowing from the EGR conduit into the mixing portion.

17. The fuel insertion system of claim 16, further comprising:

a flowrate sensor operatively coupled to the mixing portion or the EGR conduit and configured to measure the flowrate of the recirculated exhaust gas flowing into the mixing portion, wherein the controller is further configured to:

receive an EGR flowrate signal from the flowrate sensor and determine the flowrate of the recirculated exhaust gas therefrom, and based on the flowrate of the recirculated exhaust gas, operate the EGR valve to adjust the flowrate of the recirculated exhaust gas.

18. A method for controlling fuel assisted flow of a recirculated exhaust gas to an engine via a fuel ejector assembly, the method comprising:

determining, by a controller based on a pressure signal received from a pressure sensor, at least one of an engine pressure or a mixture pressure, the mixture pressure comprising a pressure of a mixture, the mixture comprising a fuel and the recirculated exhaust gas;

determining, by the controller based on a flowrate signal received from a flowrate sensor, an exhaust gas recirculation ("EGR") flowrate, the EGR flowrate comprising a flowrate of the recirculated exhaust gas flowing through an EGR conduit into a mixing portion, the EGR conduit structured to communicate the recirculated exhaust gas therethrough;

adjusting, by the controller based on at least one of an operating condition of the engine, the engine pressure, or the mixture pressure, a fuel flowrate control valve to control a flowrate of the fuel to the engine, the fuel flowrate control valve fluidly coupled to a fuel conduit, the fuel conduit structured to provide the fuel to a nozzle, the nozzle structured to eject the fuel therethrough, wherein the mixing portion is disposed downstream of the nozzle and the EGR conduit, the nozzle and the EGR conduit fluidly coupled to the mixing portion such that the mixing portion receives each of the fuel and the recirculated exhaust gas, and wherein a diffuser is disposed downstream of the mixing portion and structured to be fluidly coupled to the engine to communicate the mixture to the engine;

adjusting, by the controller based on at least one of the operating condition of the engine, the engine pressure, or the mixture pressure, a bypass valve to control a fuel flowrate to the engine, the bypass valve fluidly coupled to a bypass line, the bypass line coupled to the fuel conduit upstream of the nozzle and structured to receive a portion of the fuel and communicate the portion of the fuel downstream of the diffuser and upstream of the engine; and adjusting, by the controller based on the EGR flowrate and at least one of the engine pressure or the mixture pressure, an EGR valve to control the EGR flowrate to the engine.

19. The method of claim 18, further comprising determining, by the controller, the operating condition of the engine, the operating condition of the engine comprises one of an idling condition, a low speed condition, a high speed condition, and a high torque condition.

* * * * *